United States Patent [19]

Ferguson et al.

[11] 4,264,025
[45] Apr. 28, 1981

[54] TIEDOWN BRACKET WITH RATCHET DISC

[75] Inventors: Douglas J. Ferguson, Davisburg; Daniel J. Kowalski, Ortonville, both of Mich.

[73] Assignee: Four Star Corporation, Troy, Mich.

[21] Appl. No.: 15,327

[22] Filed: Feb. 26, 1979

[51] Int. Cl.$^2$ .............................................. B60R 9/04
[52] U.S. Cl. ................................... 224/321; 224/324; 224/322; 224/325
[58] Field of Search ............... 224/325, 309, 314, 329, 224/330, 331; 248/214, 222.1, 222.3, 225.1, 225.4, 245, 295, 298

[56] References Cited
U.S. PATENT DOCUMENTS

| | | | |
|---|---|---|---|
| 4,132,335 | 1/1979 | Ingram | 224/324 |
| 4,133,465 | 1/1979 | Bott | 224/326 X |
| 4,162,755 | 7/1979 | Bott | 224/326 |

Primary Examiner—Steven M. Pollard
Attorney, Agent, or Firm—Reising, Ethington, Barnard, Perry & Brooks

[57] ABSTRACT

A bracket for association with an article carrier, such as a luggage carrier is adapted for sliding adjustment or positioning in a carrier track. The bracket includes a ratcheted disc for locking the bracket anywhere along the length of the track. The ratcheted disc prevents unintended loosening of the bracket and resultant movement of the bracket along the track. The bracket also includes suitable projections for detachably mounting a cross-strap thereto for supporting skis, bicycles, and other articles.

12 Claims, 4 Drawing Figures

TIEDOWN BRACKET WITH RATCHET DISC

BACKGROUND OF THE INVENTION

I. Field of the Invention

The present invention pertains to an adjustable bracket for article carriers. More particularly the present invention pertains to an adjustably positionable bracket for vehicle-related article carriers. Even more particularly, the present invention concerns adjustably positionable brackets for vehicle-associated luggage racks, ski racks, or other article carriers, having a locking means that is ratcheted preventing the loosening of the bracket and a resultant unintended movement of the bracket.

II. Prior Art

In copending U.S. patent application Ser. No. 836,966 filed Sept. 27, 1977, the disclosure of which is included by reference, there is disclosed a vehicle associated article carrier, such as a luggage rack, ski rack, or the like which incorporates certain slidably adjustable brackets therewith. According to the referenced application the brackets are variably positionable along the length of a slotted track formed in an associated slat of the article carrier.

The brackets of the copending application, generally, comprise an upper section which is disposed above the slat, a lower section which is engageable with the track and slidable therewithin and means for urging a member into locking engagement with a wall formed in the track. A review of the application indicates that an external manually operable element such as a rotatable disc, or clasp is employed to urge the aforesaid member into locking engagement. The deployment of the manually operable element lends the bracket susceptible to unintended loosening of the disc with a resultant movement of the bracket, with the potential of damage to articles carried by the article carrier. The present invention, as will subsequently be detailed seeks to overcome this problem.

STATEMENT OF RELEVANT ART

To the best of applicant's knowledge, the following is believed to be the prior art most closely related to the present invention:

U.S. Pat. Nos.: 3,677,451; 3,375,365; 3,165,353; 3,064,868; 2,988,253; 2,783,367; 3,828,993; 2,753,095; 3,902,641; 2,914,231; 2,628,123; 2,499,136; 3,719,313; 3,468,460;

as well as the copending application hereinabove referred to.

SUMMARY OF THE INVENTION

In accordance with the present invention, there is provided an adjustably positionable bracket for an article carrier, wherein the bracket is prevented from unintended movement by a ratchet disc. The bracket hereof, generally, comprises:

(a) means for variably, adjustably positioning the bracket along a track provided in an article carrier, (b) an upper section interconnected to the positioning means, and (c) a ratcheted locking means for locking the bracket in position.

The upper section optionally includes a means for receiving the ends of a tie-down strap for securing an article to the bracket and means for detachably securing a cross-strap to the bracket. The upper section may include an opening through which is laced a tie-down strap or the like. The upper section may, also, incorporate a projection to which is detachably mounted a cross-strap or other rail. Likewise, the upper section may comprises the openings as well as the cross-strap mounting projection.

As contemplated by the practice of the present invention, the bracket hereof comprises a slide plate or base adapted to be slidingly disposed in a track or channel formed in the article carrier.

The locking means hereof includes a key or wedge which is threadably secured to a ratcheted disc and which extends through the positioning means. The disc is manually rotatable by grasping projections of the disc which project from the bracket. As the disc is rotated in a first direction, the key is urged into engagement with a wall of the track to lock the bracket in position. Rotation of the disc in a counter or second direction disengages the key from the track to permit movement of the bracket.

In a preferred embodiment of the present invention the bracket hereof is slidably mounted in a vehicle mounted article carrier slat having a track or channel formed therein.

For a more complete understanding of the present invention reference is made to the following detailed description and accompanying drawing. In the drawing, like reference characters refer to like parts throughout the several views, in which:

DESCRIPTION OF THE PREFERRED EMBODIMENT

Figure 1:
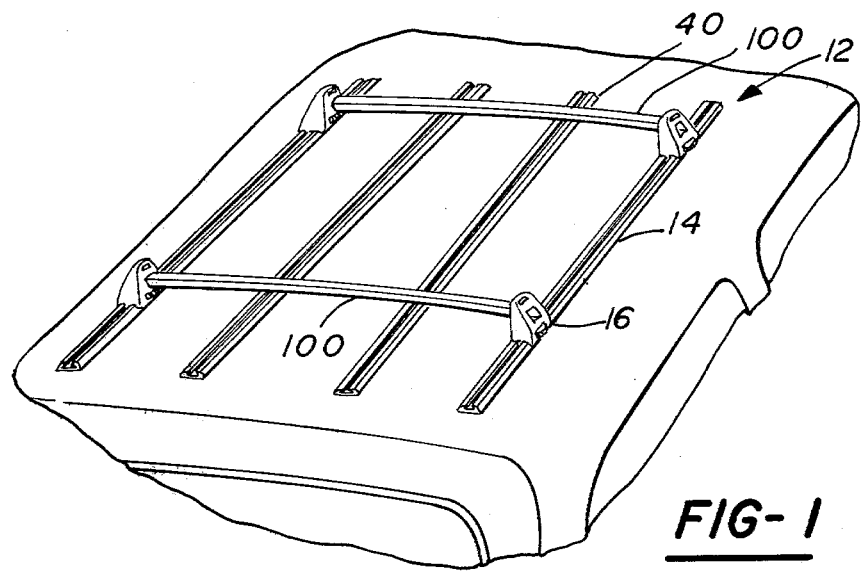
FIG. 1 is a perspective view of a vehicular associated article carrier incorporating a preferred embodiment of a bracket in accordance with the present invention.

Now, and with reference to the drawing, there is depicted therein a bracket in accordance with the present invention as well as an article carrier incorporating the bracket hereof. The bracket hereof, generally, comprises an adjustably positioning bracket, wherein unintended loosening and adjustment of the bracket is prevented, which includes:

(a) a base for variably adjustably positioning the bracket along the extent of an article carrier, (b) an upper section interconnected to the base, the upper section comprising means for receiving an article retainer and (c) means for releasably locking the bracket in position, the locking mechanism including a ratcheted disc to prevent unintended movement of the bracket.

At the outset, it should be noted, that as used herein and in the appended claims, the term "article carrier" contemplates a luggage rack, ski rack or similar type of vehicle-related or associated device. As is known to the skilled artisan, such devices, ordinarily, contemplate a plurality of spaced apart slats which support a load or article disposed thereon. Such devices, also, adopt and incorporate side rails, and stationary and/or movable cross-straps where appropriate. If required, stanchions are utilized to support the side rails and stationary cross straps. The article carriers are, usually, mounted to either the vehicle roof or trunk lid or deck. In the practice hereof, it is to be understood that the present invention is applicable to all such article carriers so long as the carrier, per se, can receive the bracket as is detailed subsequently.

Referring again, to the drawing and in particular FIGS. 1-4, there is depicted therein a preferred embodiment of the present invention. In accordance herewith, there is provided a vehicle body section 10 having an article carrier 12 disposed and affixed thereon. The article carrier depicted in the drawing comprises a plurality of slats 14. The slats 14 are longitudinally extending members which are affixed to the vehicle body by any suitable mode, such as threaded fasteners (not shown) or the like.

As defined by the present invention, the article carrier 12 comprises at least one slat 14 adapted to receive a tie-down bracket 16 in accordance with the present invention. The slat 14 contemplated for use herein, generally, comprises a member 18 having a substantially planar lower surface 20. The surface 20 is designed to be contiguous with the vehicle body when affixed thereto. The upper surface 22 of the slat 14 is provided with bracket-receiving means 24. The bracket receiving means 24 comprises a channel 26. The channel or track 26, in a preferred embodiment, includes a longitudinal slot 28 formed substantially along the extent of the upper surface and is formed downwardly therefrom. The slot 28 is in registry with and opens up into an enlarged guidepath 30. The guidepath is coextensive with the slot 28. The guidepath 30 includes a bottom wall 32 which defines a seat for the bracket 16 in a manner to be described subsequently. The junction between the slot 28 and the guidepath 30 is defined by a pair of opposed inwardly directed shoulders 34, 36 respectively. As will subsequently be described, the wall 32 and the shoulders 34, 36 cooperate to retain the bracket 16 in fixed position when the bracket is placed in a locked position.

It should be noted that the salt 14 can comprise a formed sheet metal member, a solid or hollow interior extrusion or the like, as desired. The criticality to be attached to the slat is that it be provided with the longitudinally extending channel 26. Also, the slat 14, further, comprises means 38 for limiting the longitudinal movement of the bracket 16 in the track 26. For example, the limiting or stop means 38 can comprise an end cap 40 journalled onto one end of the strap 14. Alternatively, an obstruction such as an oval head screw 42 can be disposed in the channel 26, as shown. The obstruction disrupts the path of travel of the bracket to prevent passage therepast.

As heretofore noted, the slat 14 receives the bracket 16. The bracket 16 comprises (a) a base section 44 for adjustably positioning the bracket along the extent of the track 26, (b) an upper section 46 integral with the base, and (c) means 50 for releasably locking the bracket in position. The bracket 16 hereof may, also, comprise means 52 for detachably mounting an article carrier cross-strap 54 thereto. The upper section may, also, comprise means 48 for receiving an article carrier tie-down strap or the like.

With more particularity, the base section 44 is slidably movable in the track 26. Thus, the base section is configured to fit and slide in the track 26. Preferably, the base section includes a lower body 56 analogously configured to, but being dimensionally slightly less than that of the guidepath 30. This dimensioning enables the lower body 56 to be slid, with facility, along the length of the guidepath. The body 56 can have other configurations so long as it can slide within the track.

A shank 58 projects upwardly from the lower body 56 and is integrally formed therewith. The shank 58 is disposed substantially perpendicular to the lower body and centrally thereof. The shank 58 is coextensive with the lower section along the longitudinal extent thereof. The shank 58 has a width slightly less than that of the slot 28 and projects thereabove, as shown.

It is to be appreciated that the base defines means for variable adjustably positioning the bracket, per se, along the extent of the track.

The upper section 46 is integrally formed with the base section 44 and is united therewith at the junction of the shank 58 with the lower end of the upper section 46. The upper section is substantially equal in length to the base. As shown in the drawing, the upper section has an irregular configuration and may include the means 48 for receiving an article carrier tie-down device.

More specifically, and in a preferred embodiment, of the bracket the upper section includes a lower end 60. The lower end 60 is configured analogously to that of the upper surface of the slat 14. This is done to produce load bearing distribution over the entire width of the slat. Upstanding from the lower end 60 are a pair of opposed, side walls 62, 64, respectively. The side walls and end walls are integrally formed to define a unitary structure for the upper section. A top wall 70 encloses the structure. Also, a rear wall (not shown) may unite the side walls and the end walls.

The means 48 comprises an opening 76 bounded on the sides by the uppermost portion of walls 66 and 68. An article retainer, such as a tie-down strap 54 is insertable through the opening 76 and foldable back upon itself through the opening 76, as shown. Alternately, the tie-down strap 54 can be attached to the top wall 70 by any suitable means including rivets, threaded fasteners, adhesive bonding or the like. Furthermore, the means 48 can be defined by a loop integral with the top wall, or other strap retaining or receiving means. Thus, it is to be perceived that an article, such as a bicycle, luggage rack or the like can be placed upon the carrier 12, and tied down with the straps 54 which are threaded through the means 48 or the opening defined in the end walls and side walls provided in the bracket 16.

Figure 3:
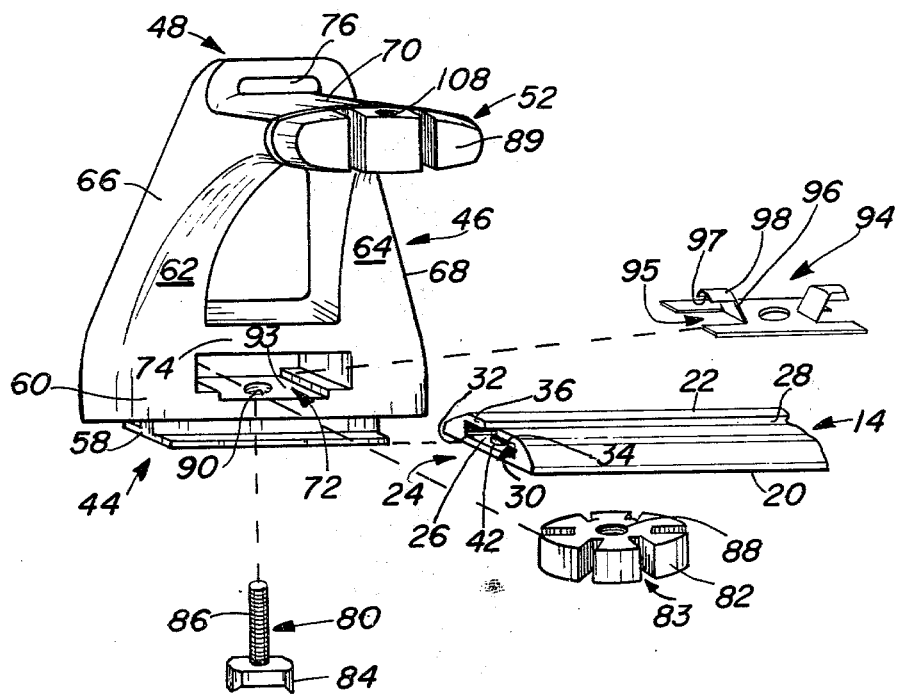
FIG. 3 is a perspective, exploded view of the bracket hereof and the carrier slat.

As clearly shown in FIG. 3 the lower end 60 has a frontal opening 72 formed therein which extends across the lower end 60. A ledge 74 extends between the end walls 66 and 68 and is disposed parallel to the top wall 70 of the upper section to enclose the frontal opening 72.

Referring, again, to the drawing, as heretofore, noted, in order to set the bracket in any position along the length of the associated track, the present invention further comprises means 50 for releasably locking the bracket 16 in position. The locking means 50, generally, comprises a locking key 80 and a ratcheted rotatable disc 82 threadably interconnected to the key.

The key 80 is defined by a solid body 84 and a threaded shaft 86. The shaft 86 has a threaded profile formed about the periphery thereof. The shaft 86 is integrally formed with the solid body 84 and projects outwardly therefrom.

The disc 82 has a central bore 88 passing through the center of the disc. The disc 82 is configured to be slidingly received by the frontal opening 72 with portions of the periphery of the disc 82 projecting radially outward from the frontal opening 72. The internal periphery of the disc about the central bore 88 is provided with a threaded profile. The threaded profile of the shaft is complementary to that of the periphery of the bore 88. Furthermore, the diameter of the bore 88 is substantially equal to that of the shaft. Thus, the shaft and the bore 88 cooperate to define means for threadably interconnecting the disc 82 and the key 80.

Figure 4:
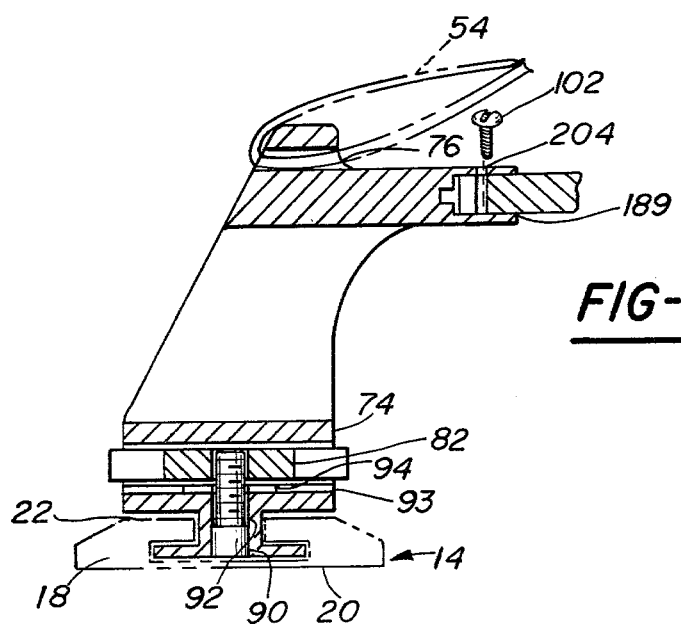
FIG. 4 is a cross-sectional view of the bracket hereof taken along line 4—4 in FIG. 2.

As shown in FIGS. 3 and 4, the lower body 44 has an upwardly directed recess forming a keyway 90 therein. The keyway has a height substantially equal to that of the body 84 to enable the body to nest therewithin. The keyway 90 projects upward communicating with the frontal opening 72, thus, providing a space through which the shaft 86 projects.

The frontal opening 72 has a recess 93 formed therein which receives a spring detent 94. The spring detent 94 is optionally, formed from a flat spring steel material of rectangular shape. A pair of parallel notches 95 are formed in the spring detent 94 projecting in from the ends to a distance short of the center thereby forming a pair of legs 96. The legs 96 project downward and outward, as shown. The sides 97 of the legs 96 curve upward in an arcuate manner to form a detent 98. The spring detent 94 is snugly received in the recess 93. It is to be noted that the recess 93 can be formed in the lower wall of the opening and the spring detent 94 can be implaced therein with equal efficacy.

The disc 82 has a plurality of radial slits 83 projecting radially inward from its periphery terminating a distance from the bore 88 and configured to receive the detent 98 formed at the end of the legs 96. The legs 96 are biased into engagement with the slits 83. The detent action of the detents 98 in the slits 83 define a ratcheting means to prevent any accidental rotation of the disc 82 and resultant loosening of the bracket which may cause unintended movement of the bracket along the slat.

It is to be appreciated that the locking means is mounted by inserting the key into the keyway and the disc into the frontal opening aligning the shaft with the disc opening and threadably, interconnecting the disc and the shaft by rotating the disc.

The locking mechanism functions by implacing the bracket in the track and sliding same to the desired position. Thereafter, the disc is rotated in a first direction by hand. Rotation of the disc urges the key downwardly into engagement with a wall of the track guidepath 30 and preferably, the bottom wall 32. This wedges and locks the lower body between the bottom wall 32 and the opposed shoulders 34,36. Rotation of the disc in the opposite direction against the detent withdraws the key into the keyway, thereby releasing the wedge from engagement with the bottom wall 32. Thus the bracket is free to be slid in the track. When the shaft 86 and the disc 82 have been assembled and implaced in the track, the disc and shaft are trapped in the bracket and cannot be disassembled.

It should, also, be noted that other wedging arrays can be used with equal efficacy. For example, the base 44 can be urged into engagement with the shoulders via a screwjack effect between the disc and the base to thereby closeup the bracket about the walls 22, 28. This variation is within the scope hereof.

Figure 2:
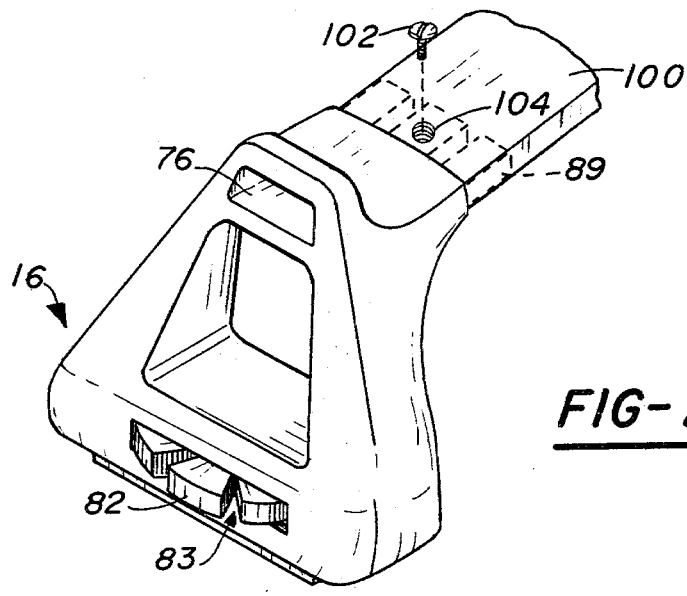
FIG. 2 is a perspective view of the bracket of the present invention.

Referring again, to the drawing and in particular to FIGS. 2 and 3, it will be noted that the end walls 66 and 68 extend upward from the lower section to the top wall 70, extending therebeyond a distance curving together to form a loop 76. Immediately below the loop and perpendicular thereto is a cross-strap mounting member 89. The mounting member 89 has a cross section configured to snugly fit the interior of a steamlined cross-strap 100. A fastener, such as a bolt 102 threadably interconnects the cross-strap 100 to the bracket 16 via an opening 104 formed in the cross-strap and which registers with a threaded bore 108. Thus, and in accordance with the embodiment of the invention, the bracket, also, defines means for positioning a cross-strap for a luggage rack or similar article carrier. The cross-strap can also be attached to the bracket by other mounting means including a threaded rod extending from the end of the cross-strap to engage a mating threaded aperture in the upper wall 70. The configuration of the remainder of the upper section can adopt either of the article retainer-receiving means described hereinabove with or without the cross-strap mounting member.

Alternatively, a pocket 189 (FIG. 4) can be formed in the bracket to snugly receive and surround an end of the cross strap. An aperture 204 intersecting the pocket 189 is aligned with a threaded aperture near the end of the cross strap. A threaded fastener 102 passing through the aperture 204 engaging the threaded aperture secures the cross strap to the bracket.

It should be readily understood that movement of the bracket along the track will vary the tension of a strap threaded therethrough and secured to an article to be transported, such as a bicycle or the like.

It is to be appreciated that there has been described herein a tie-down bracket for an article carrier that can be readily locked in any desired position in a tracked formed in a slat and no unauthorized movement of the bracket is permitted without the hand rotation of the disc 82 for locking and unlocking the bracket.

Having thus described our invention, what we claim is:

1. A tie-down bracket for an automotive vehicle mounted article carrier comprising:
   a lower base section engageable with a track formed in a slat of the article carrier;
   an upper section interconnected to the base section;
   a rotatable disc mounted onto the bracket;
   means for selectively locking the bracket in the track responsive to rotation of the disc; and
   means for ratcheting said disc to releasably lock said bracket in a pre-selected position along the length of a slot formed in the track, and wherein the disc is rotatable only against the ratchet.

2. A tie-down bracket for an automotive vehicle mounted carrier as defined in claim 1 wherein said ratcheted releasable locking means comprises:
   a spring detent engageable with the disc, the disc having a plurality of radial slits projecting inward from a periphery ending a distance from the bore, the spring detent being normally biased into the slits to define a rachet against which the disc rotates.

3. The bracket of claim 1 which further comprises:
   a cross-strap mounting member disposed on the upper section.

4. The bracket of claim 1 wherein:
   the upper section is provided with a first opening therethrough, the opening defining the means for receiving a tie-down strap, the strap being threadable through the first opening.

5. The bracket of claim 1 wherein the means for selectively locking comprises:
   a key member carried by the bracket for releasably engaging the track;
   a threaded shaft integrally formed with the key member and projecting upwardly therefrom, the shaft being threadably interconnected to the disc; and
   wherein rotation of the disc in a first direction urges the key member into engagement with a wall of the track and counter rotation of the disc releases the key member from engagement.

6. The bracket of claim 5 wherein the base section is provided with a recess in registry with a frontal opening formed in the upper section being nestable within the recess when the disc is rotated to release the key member to allow movement of the bracket, the disc being mounted in the frontal opening.

7. In combination with an article carrier for an automotive vehicle of the type comprising an elongated slat, the slat having a longitudinally extending track formed therein, a tie-down bracket therefor, the bracket comprising:
   a base section engageable with the track formed in the slat, the base being slidable along the extent of the track;
   an upper section interconnected to the base section and disposed above the slat;
   a rotatable disc mounted onto the bracket;
   means for selectively locking the bracket in the track responsive to rotation of the disc; and
   means for ratcheting said disc to releasably lock said bracket in a pre-selected position along the length of a slot formed in the track, and wherein the disc is rotatable only against the ratchet.

8. The combination of claim 7 which further comprises:
   a cross-strap mounting member disposed on the upper section.

9. The combination of claim 7 wherein:
   the upper section is provided with a first opening therethrough, the opening defining means for receiving a tie-down strap, the strap being threadable through the first opening.

10. The combination defined in claim 7 wherein said means for ratcheting said disc comprises:
    a spring detent, the disc having a plurality of radial slits projecting radially inward from the periphery hereof, the spring detent being normally biased into the slits to define the ratchet against which the disc rotates.

11. The combination of claim 7 wherein the means for selectively locking comprises:
    a key member carried by the bracket for releasably engaging the track;
    a threaded shaft integrally formed with the key member and projecting upwardly therefrom, the shaft being threadably interconnected to the disc; and
    wherein rotation of the disc in a first direction urges the key member into engagement with a wall of the track and counter rotation of the disc releases the key member from engagement.

12. The combination of claim 10 wherein:
    the base section is provided with a recess in registry with a frontal opening formed in the upper section, the key member being nestable within the recess when the disc is rotated to release the key member to allow movement of the bracket, and disc being mounted in the frontal opening.

* * * * *